Feb. 17, 1948.     G. C. WEBSTER     2,435,989
CABLE CONNECTING DEVICE
Filed Nov. 21, 1945
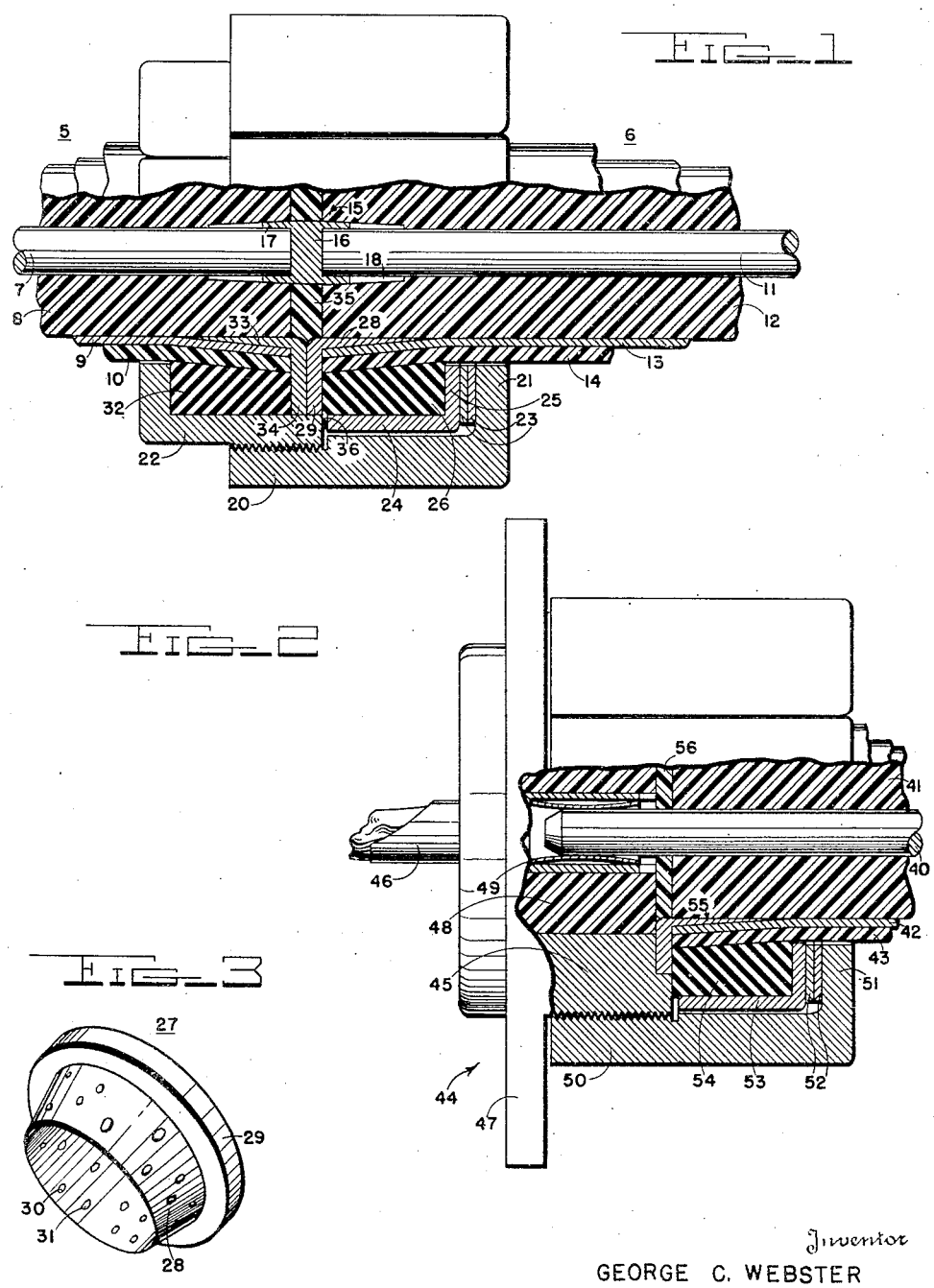
Inventor
GEORGE C. WEBSTER
By M. E. Hayes
Attorney Patented Feb. 17, 1948

2,435,989

UNITED STATES PATENT OFFICE 2,435,989

CABLE CONNECTING DEVICE

George C. Webster, Washington, D. C.

Application November 21, 1945, Serial No. 630,105

5 Claims. (Cl. 174—84)

(Granted under the act of March 3, 1883, as amended April 30, 1928; 370 O. G. 757)

This invention relates to cable connecting devices, and more particularly to a cable connecting device for coaxial type cable.

In electrical apparatus, and particularly in high frequency electronic apparatus, it is sometimes the practice to employ coaxial type cables as the transmission lines for interconnecting the several elements of the apparatus and for connecting the apparatus to the antenna. Where such cables are employed, it is usually necessary to use specially adapted connecting or coupling devices. Heretofore, such connecting or coupling devices as have been available have for the most part been large, complicated, and difficult to assemble, and, in addition have required substantial modification or shaping, of the ends of the coaxial cables with which they are to be associated.

An object of the present invention is to provide a new and improved electrical connecting device, and particularly a connecting device for coaxial cable.

A further object of this invention is to provide a connecting device for coaxial type cable which will require a minimum modification of the cable end.

A further object of this invention is to provide a connecting device for coaxial cable which is simple to assemble and small relatively to the size of the cable.

A further object of this invention is to provide a cable connecting device for coaxial type cable which will provide a good impedance match between the cables being connected.

Other objects and advantages of the present invention will be apparent from the following detailed description taken in conjunction with the drawings, wherein:

Fig. 1 is a longitudinal, sectional view, partly in elevation of a cable connecting device constructed in accordance with this invention for connecting two coaxial type cables;

Fig. 2 is a longitudinal, sectional view of a cable connecting device constructed in accordance with this invention for connecting a coaxial type cable to a coaxial type terminal; and Fig. 3 is a detail, perspective view of the annular wedge employed with the connecting device of this invention.

Referring now to the drawings, and particularly to Fig. 1 thereof, it will be seen that two substantially identical coaxial type cables 5 and 6, respectively, have been shown connected end on by the coupling device of this invention. The left cable 5, as viewed in this drawing, comprises a rod shaped inner conductor 7, which is surrounded by a layer of electrical insulating material 8. A tubular outer conductor 9, concentrically disposed with respect to the inner-conductor 7, encloses the insulation 8 and is itself enclosed by a sheath 10 of electrical insulating material having suitable protective characteristics. Similarly the right cable 6 comprises a rod shaped, inner conductor 11, a layer of insulation 12, and outer conductor 13, and a protective sheath 14. From the foregoing description it will be seen that both cables are of conventional coaxial cable design. Ordinarily, in order to couple two such cables considerable modification of the cable ends is required. For example, one practice is to strip the insulating layers 8 and 12 back a substantial distance to expose the inner conductors and then to strip the sheaths 10 and 14 back to expose the outer conductors. In order to connect such cables a coupling device comprising a plurality of clamping sleeves may be assembled over the end providing a bulky and complicated coupling. It will be apparent that such modifications of the cable ends are not only relatively difficult, but also time consuming.

In accordance with the present invention a connecting device for coaxial type cable has been provided which requires substantially no modification of the end of the cable and which is extremely simple and efficient. In order to facilitate an understanding of the present invention, the description of the connecting device will be incorporated in the description of its assembly on the cable; however, it will be understood that the order in which the several steps in the assembly operation are described is not critical, but is largely a matter of choice.

In order to prepare the cables to be coupled by the connecting device of this invention it is merely necessary to cut the end to be coupled of each of the two cables transversely with respect to its axis to provide a substantially flat end surface on each cable. Then, in accordance with the embodiment of this invention shown in Fig. 1, one end of a sleeve 15 of electrically conductive material, the sleeve having a solid, central portion 16, and longitudinally slotted, inwardly tapering end portions 17 and 18, respectively, extending axially from either side of the central portion 16, is inserted between the layer 12 of insulation and the inner conductor 11 of the cable 6, the sleeve being inserted as far as feasible. By slotting and tapering the ends of the sleeve, they may be inserted readily in this manner, and when so inserted in both cables, will engage closely the inner conductors of the cables, interconnecting the inner conductors.

In the next step, a large collar 20 is assembled over the end of one of the cables, for example, as shown in Fig. 1, over the right cable 6, an inwardly extending flange 21 of the collar being placed on the cable first. The left portion of the collar is internally recessed and the recessed portion thereof is threaded so as to receive and engage a somewhat smaller collar 22, which is assembled on the adjacent cable 5 in a later step and which is externally threaded to threadedly engage the threaded portion of the collar 20. A number of anti-friction washers 23 are then assembled over the end of the cable 6, the inner diameters of the washers being such that they are freely rotatable about the protective sheath 14 of the cable 6 and the outer diameters being such that they are receivable within the right portion of the collar 20 and will seat against the inner side of the flange 21. A second collar 24, having an external diameter slightly less than the internal diameter of the collar 20 is then inserted within the collar 20 so that its inwardly flanged end 25 bears against the left washer 23. The collar 25 serves as a housing for a flat ring 26, which is assembled over the end of the cable 6 and located between the sheath 14 and the collar 24, the inner face of the ring 26 being tapered outwardly to the left, as viewed in this drawing. The ring 26 is made of a relatively dimensionally stable, resilient material, such as rubber, so that when it is compressed, while partially confined within the housing collar 24 in the final assembly step, it will tightly engage the periphery of the cable 6. By selecting the confining collar 24 to have an external diameter slightly less than the internal diameter of the collar 20 and providing the washers 23, the collar 20 is made initially freely rotatable with respect to the collar 25, thus facilitating assembly.

In order to retain the collar 20 on the cable 6, and also to interconnect the outer conductors of the two cables, a wedge 27, shown in detail in Fig. 3, having a tapered sleeve portion 28 and a flange 29 integrally formed therewith at its larger end, is inserted into the left end of the cable 6 between the intermediate insulation 12 and the outer conductor 13, the taper of the sleeve shaped portion of the wedge and the thickness of the wedge being selected so that the outer conductor and sheath are forced, or flared outwardly against the inner wall of the ring 26, thus enlarging the end of the cable. The tapered portion 28 of the wedge 27 has formed therethrough a number of apertures or perforations 30 in which are located solder 31, or other readily fusible electrically conducting material. After the wedge is inserted into position in the cable end, then by applying heat to the flanged portion 29, as by touching this portion with a soldering iron, the solder 31 may be caused to fuse and both secure the wedge in position as well as insure a satisfactory electrical connection between the wedge and the outer conductor 13.

The cable 5 is similarly prepared by positioning a flat ring 32, similar to the ring 26 heretofore described, about the periphery of the right end thereof and within the collar 22, which is previously assembled on the cable 5, as shown. Since, ordinarily, it will be preferable that the collar 22 be fixed with respect to the cable 5, no washers or intermediate collars are provided, as is done with the cable 6. The ring 32 is internally tapered so as to flare outwardly to the right.

A second sleeve shaped wedge having a tapered portion 33 and a flange 34, similar to the wedge 27, is then inserted between the intermediate insulation 8 and the outer conductor 9 of the cable 5 to cause the end thereof to be enlarged by flaring outwardly. The wedge is made of electrically conductive material and is provided with suitable apertures in which solder or other fusible electrically conducting material is disposed, which when heated will melt and secure the wedge to the conductor 9 in the same manner as the wedge 27 is secured to the conductor 13.

While the wedges have been shown and described as being located between the outer conductor and intermediate insulation of each cable, in some cases it may be desirable to locate the wedges between the outer conductor and the protective sheath. Also it will be apparent that while a tapered wedge has been shown, the tapering is provided primarily to facilitate insertion and consequently an untapered wedge may be employed where insertion of such a wedge would be feasible.

In the final assembly, an annular disc 35 of electrical insulating material is positioned around the midportion 16 of the sleeve 15, the inner diameter of the disc being selected so that it closely engages the periphery of the midportion of the sleeve while the outer diameter of the disc is such that its periphery extends substantially to the outer edge of the intermediate layers 8 and 12 of the cables. The disc 35 is made of a deformable, plastic material, such as polyisobutylene, so that when compressed it will effectively seal this portion of the coupling. The tapered portion 17 of the sleeve 15, positioned on the inner conductor of the cable 6 is then inserted in the cable 5 between the inner conductor 7 and the intermediate insulation 8 as far as feasible. The collar 22 is then moved to the right while the collar 20 is moved to the left to engage the threaded portion thereof with the threaded periphery of the collar 22. By rotating the collar 20 relatively to the collar 22, the coupling is tightened, causing the flanges 29 and 34 of the wedges to engage or contact and forcing the tapered portions of the sleeve 15 completely into the cable end. By a proper selection of the relative sizes of the disc 35 and of the wedging members 27 and 33, it will be apparent that a tight connection may be obtained and that when properly tightened, the flanged portions of the wedges will be caused to bear firmly against each other providing electrical connection and connecting the outer conductors of the two cables, while the inner conductors are connected by the sleeve 15. In some cases, in order to obtain a satisfactorily sealed coupling, a flange 36 may be integrally formed with the left side of the ring 26, as viewed in Fig. 1, so that during this final assembly the flange 36 will be compressed between the left end of the collar 24 and the right end of the collar 22. In practice, it has been found that this coupling, when made and assembled as described, will provide a completely waterproof and gastight connection.

In Fig. 2, a modification of the present invention is shown whereby a cable of coaxial type may be connected to a coaxial type terminal rather than to a coaxial cable. Referring to this figure, it will be seen that the left end of a coaxial cable of conventional design is shown, the cable comprising an inner conductor 40, surrounded by a layer 41 of electrically insulating material, a concentrically disposed outer conductor 42, and a protective sheath 43 of suitable material covering the outer conductor. In accordance with this embodiment of the present invention, this cable is shown connected to a terminal assembly, designated generally as 44, and comprising a heavy, cylindrical housing 45, having a flange 47 integrally formed adjacent the right end thereof, whereby the terminal may be rigidly mounted in an apparatus housing, the flange being slightly spaced from the right end. The portion of the housing to the right of the flange 47 is externally threaded to receive a suitable coupling collar associated with the cable end. The housing 44 serves as the outer conductor of the terminal, while a lead 46, associated with the terminal and coaxially mounted with respect to the housing 45, is connected at its right end to a spring terminal of the female type having a number of concentrically disposed, longitudinally extending, spring contact fingers 49, as is well known in the art, which are located within the right portion of the housing 45, thus forming the inner conductor. A heavy sleeve 48 formed of electrically insulating material is disposed within the right portion of the housing 45, between the inner wall thereof and the periphery of the inner conductor 46, and serves to support the inner conductor coaxially with respect thereto.

In preparing the end of the coaxial cable to be connected to this terminal, the outer sheath 43, the outer conductor 42, and the intermediate insulation 41 are stripped back a sufficient distance to expose a length of the inner conductor 40 suitable to be received within the terminal contact fingers 49 and to be engaged thereby. A large collar 50 similar to the collar 20 hereinbefore described, is assembled over the left end of the coaxial cable with an inwardly flanged portion 51 thereof positioned to the right. A number of washers 52, similar to the washers 23, are then assembled between the sheath of the cable and the inner wall of the collar 50, the right washer bearing against the inner side of the flange 51. A second collar 53, similar to the collar 24, is then assembled within the collar 50 and a flat ring 54, similar to the ring 26 and having its inner side tapered outwardly to the left, is assembled within the collar 53. The end of the cable is then flared by inserting a sleeve shaped wedge 55, similar to the wedges 27 and 33, between the intermediate insulation 41 and the outer conductor 42, this wedge being secured in position on the cable by soldering, as hereinbefore described. A flat annular disc 56 of electrically insulating material, similar to the material of which the disc 35 is made, is then placed over the exposed end of the inner conductor and is selected to have an external diameter substantially the same as the external diameter of the insulation 41.

It will be apparent from the foregoing that by moving the large collar 50 to the left to cause it to engage the threaded periphery of the outer conductor of the terminal, and then threading it tightly thereon, the cable may then be rigidly connected to the terminal and electrical connection effected between the outer conductor 42 and the terminal housing 45 by the wedge 55, the flanged portion of which will bear against the housing, which may be recessed as shown, while the inner conductor 40 is connected to the conductor 46 by the spring fingers 49. The deformable ring 56 and the ring 54 when compressed, by tightening the collar 50 on the terminal, effectively seal the connection.

Where herein the various parts of the invention have been referred to as being located in the right or left position, it will be understood that this is done solely for the purpose of facilitating description and that the references relate only to the relative positions of the parts as shown in the accompanying drawing.

While but two embodiments of this invention have been shown and described in conjunction with two conductor type coaxial cables, it will be understood that many changes and modifications may be made therein without departing from the spirit or scope of the present invention and that this invention is equally applicable to single or to multi conductor coaxial type cables.

The invention shown and described herein may be manufactured and used by or for the government of the United States of America for governmental purposes without the payment of any royalties thereon or therefor.

What is claimed is:

1. In a connecting device for plural conductor coaxial type cable, a perforated annular wedge of electrically conductive material receivable in an end of said cable and engageable when so received with one of the conductors of said cable, said wedge when received in said cable end causing said cable end to be flared outwardly, and a fusible electrically conductive material associated with the perforations of said wedge for securing said wedge to said conductor and electrically connecting said wedge with said conductor.

2. In an electrical connecting device for interconnecting coaxial type cables each having an inner conductor, a layer of insulating material thereover, an outer conductor concentrically disposed with respect to said inner conductor, and a sheath of electrical insulating material over said outer conductor, means for inter-connecting the inner conductors of said cables, annular perforated wedging means formed of electrically conductive material receivable in the end of each cable and engageable with the outer conductor of each cable for causing the end of each cable to be flared outwardly, and a fusible electrically conductive material associated with the perforations of said wedging means for securing and electrically connecting said wedging means to said outer conductors, said wedging means being brought into mutual engagement to inter-connect the outer conductors of said cables.

3. In an electrical connecting device for interconnecting coaxial type cables, each having an inner conductor, a layer of insulating material thereover, an outer conductor concentrically disposed with respect to said inner conductor, and a sheath of electrically insulating material over said outer conductor, means for inter-connecting the inner conductors of said cables, wedging means of electrically conductive material receivable in the end of each cable and engageable with the outer conductor of each cable for causing the end of each cable to be flared outwardly, and means associated with said cables and retained thereon by said outwardly flared ends for mechanically coupling said cables together and causing said wedging means to be engaged to interconnect the outer conductors of said cables.

4. A device for connecting the ends of two coaxial cables having inner conductors, layers of insulation over said inner conductors, concentrically disposed outward conductors, and sheaths of electrically insulating material over said outer conductors, comprising a sleeve shaped member formed of electrically conductive material and having inwardly tapering ends, one of said ends being receivable between the inner conductor and the intermediate insulation of one of said cables while the other of said tapered ends is receivable between the inner conductor and the intermediate insulation of the other of said cables; said sleeve providing electrical connection between said inner conductors; an annular wedge of electrically conductive material receivable in an end of each cable and engageable when so received with the outer conductor of each cable; said wedges when received in said cables causing said cable ends to be flared outwardly, and means associated with said cable ends and retained thereon by said outwardly flared portions thereof for mechanically coupling said cables together and engaging said wedges to interconnect said outer conductors.

5. A device for connecting the ends of two coaxial cables having inner conductors, layers of insulation over said inner conductors, concentrically disposed outer conductors, and sheaths of electrically insulating material over said outer conductors, comprising a sleeve-shaped member formed of electrically conductive material and having inwardly tapering ends, one of said ends being receivable between the inner conductor and the intermediate insulation of one of said cables while the other of said tapered ends is receivable between the inner conductor and the intermediate insulation of the other of said cables, said sleeve providing electrical connection between said inner conductors, an annular wedge of electrically conductive material receivable in an end of each cable and engageable when so received with the outer conductor of each cable, said wedges when received in said cable ends causing said cable ends to be flared outwardly, a fusible, electrically conductive material associated with said wedges for securing said wedges to said outer conductors and electrically connecting said wedges with said conductors, and means associated with said cable ends and retained thereon by said outwardly flared portions thereof for mechanically coupling said cable together and engaging said wedging means to electrically connect said outer conductors.

GEORGE C. WEBSTER.

REFERENCES CITED

The following references are of record in the file of this patent:

UNITED STATES PATENTS

| Number | Name | Date |
| --- | --- | --- |
| 1,718,817 | Greene | June 25, 1929 |
| 1,951,654 | Green | Mar. 20, 1934 |
| 2,118,103 | Oeding | May 24, 1938 |
| 2,173,643 | Moser | Sept. 19, 1939 |
| 2,379,942 | Webber | July 10, 1945 |
| 2,397,735 | Grieb | Apr. 2, 1946 |